US008826403B2

(12) United States Patent
Bhaskaran et al.

(10) Patent No.: US 8,826,403 B2
(45) Date of Patent: Sep. 2, 2014

(54) SERVICE COMPLIANCE ENFORCEMENT USING USER ACTIVITY MONITORING AND WORK REQUEST VERIFICATION

(75) Inventors: Kumar Bhaskaran, Englewood Cliffs, NJ (US); Paul Driscoll, Church Fenton (GB); Milton H. Hernandez, Tenafly, NJ (US); Yaoping Ruan, White Plains, NY (US)

(73) Assignee: International Business Machines Corporation, Armonk, NY (US)

( * ) Notice: Subject to any disclaimer, the term of this patent is extended or adjusted under 35 U.S.C. 154(b) by 200 days.

(21) Appl. No.: 13/364,157

(22) Filed: Feb. 1, 2012

(65) Prior Publication Data

US 2013/0198827 A1    Aug. 1, 2013

(51) Int. Cl.
*G06F 17/30* (2006.01)

(52) U.S. Cl.
USPC ..................................... 726/7; 726/6; 726/27

(58) Field of Classification Search
CPC ............ G06Q 10/06311; G06Q 10/06; G06Q 10/0633; G06Q 10/103
USPC .................................................. 726/7, 6, 27
See application file for complete search history.

(56) References Cited

U.S. PATENT DOCUMENTS

| | | | |
|---|---|---|---|
| 2003/0115073 A1* | 6/2003 | Todd et al. ......................... 705/1 |
| 2003/0130820 A1* | 7/2003 | Lane, III ....................... 702/184 |
| 2004/0044693 A1* | 3/2004 | Hadley et al. .................. 707/200 |
| 2004/0230466 A1* | 11/2004 | Davis et al. ......................... 705/8 |
| 2005/0015501 A1* | 1/2005 | Kaplan et al. .................. 709/228 |
| 2005/0160480 A1 | 7/2005 | Birt et al. |
| 2006/0020530 A1 | 1/2006 | Hsu et al. |
| 2007/0095354 A1* | 5/2007 | Churchill et al. ............. 128/897 |
| 2007/0100892 A1 | 5/2007 | Kephart et al. |
| 2007/0101440 A1* | 5/2007 | Bhatia et al. ...................... 726/28 |
| 2008/0047018 A1* | 2/2008 | Baudoin et al. .................. 726/25 |
| 2009/0310764 A1* | 12/2009 | Gerhart ..................... 379/142.04 |
| 2010/0299153 A1 | 11/2010 | Curtis et al. |
| 2010/0325097 A1* | 12/2010 | Er et al. ........................ 707/702 |
| 2011/0247051 A1* | 10/2011 | Bulumulla et al. ............... 726/4 |
| 2012/0070045 A1* | 3/2012 | Vesper et al. .................. 382/128 |

* cited by examiner

*Primary Examiner* — Harunur Rashid
(74) *Attorney, Agent, or Firm* — Yee & Associates, P.C.; Lou Percello

(57) ABSTRACT

Auditing system logs of a remote client device is provided. Login session information entered at a workstation device accessing the remote client device to perform an activity associated with a work request is received. An access token is generated based on the login session information and information associated with the work request on the remote client device. The access token is compared with an audit log report of the remote client device that includes the activity associated with the work request performed by the workstation device on the remote client device. It is determined whether information in the access token matches information in the audit log report of the remote client device. In response to determining that the information in the access token does not match the information in the audit log report of the remote client device, an action alert is sent.

16 Claims, 10 Drawing Sheets

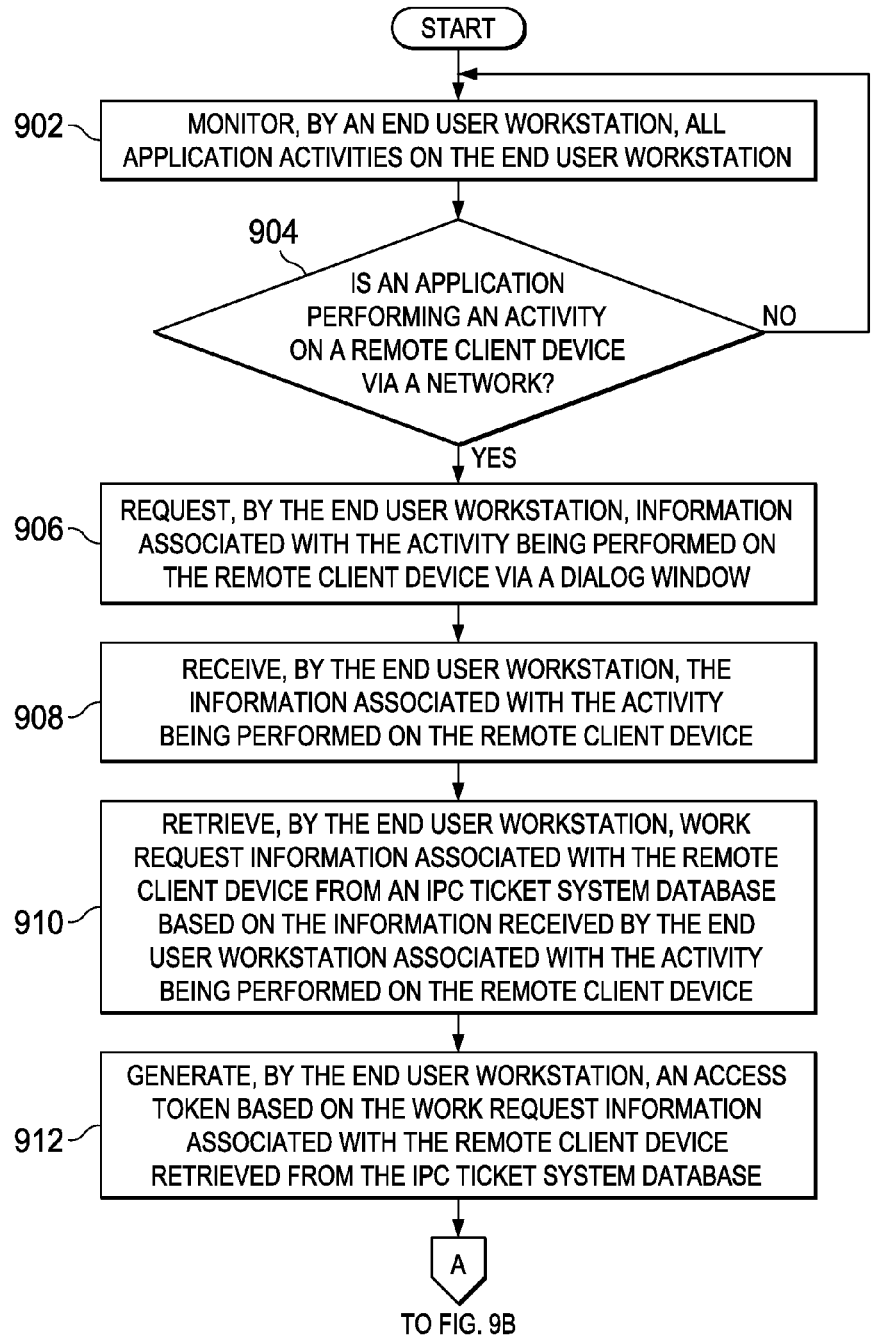

SERVICE COMPLIANCE ENFORCEMENT USING USER ACTIVITY MONITORING AND WORK REQUEST VERIFICATION

BACKGROUND

1. Field

The disclosure relates to a computer implemented method, data processing system, and computer program product for controlling point in time access to a remote client device and auditing system logs of the remote client device to determine whether monitored user activity on the remote client device associated with a work request was in compliance with one or more regulations.

2. Description of the Related Art

Network security is becoming more and more important as businesses, governmental agencies, medical institutions, financial institutions, and educational institutions spend more and more time connected online to provide services to individuals. Network security consists of provisions, policies, regulations, and laws designed to prevent and monitor unauthorized access, misuse, or modification of network-accessible resources. Network security is the authorization of access to resources within a network. Typically, users are assigned an identification (ID), such as a user name, and a password that allows the users access to the network-accessible resources on a network within their security level clearance. In other words, network security secures the network by protecting and monitoring operations being performed on network-accessible resources.

SUMMARY

According to one embodiment of the present invention, a method for auditing system logs of a remote client device is provided. A data processing device receives login session information entered at a workstation device accessing the remote client device via a network to perform an activity associated with a work request on the remote client device. The data processing device generates an access token based on the login session information entered at the workstation device accessing the remote client device to perform the activity associated with the work request and the information associated with the work request on the remote client device. The data processing device compares the generated access token based on the login session information entered at the workstation device accessing the remote client device to perform the activity associated with the work request and the information associated with the work request on the remote client device with an audit log report of the remote client device that includes the activity associated with the work request performed by the workstation device on the remote client device. The data processing device determines whether information in the generated access token matches information in the audit log report of the remote client device. In response to determining that the information in the generated access token does not match the information in the audit log report of the remote client device, the data processing device sends an action alert.

DETAILED DESCRIPTION

Figure 1:
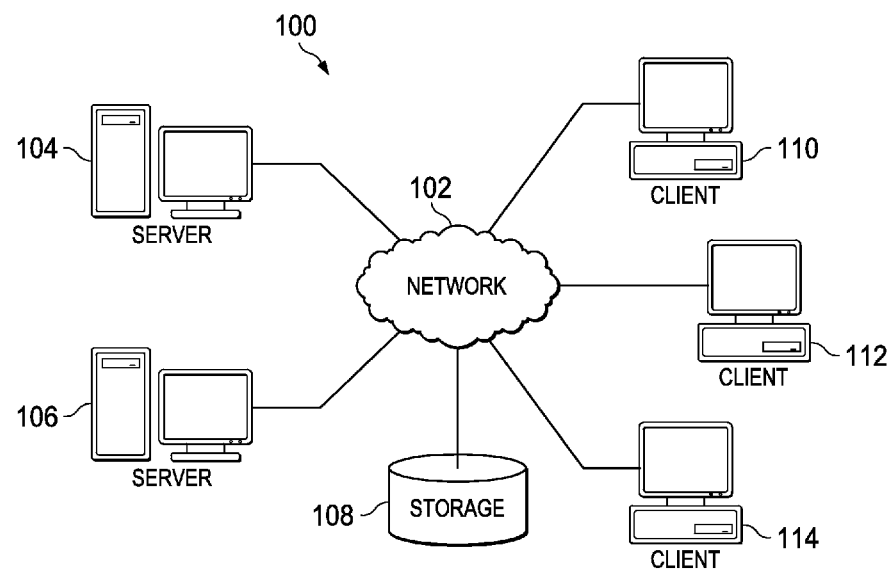
FIG. 1 is a pictorial representation of a network of data processing systems in which illustrative embodiments may be implemented.

As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electro-magnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing.

Computer program code for carrying out operations for aspects of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described below with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

Figure 2:
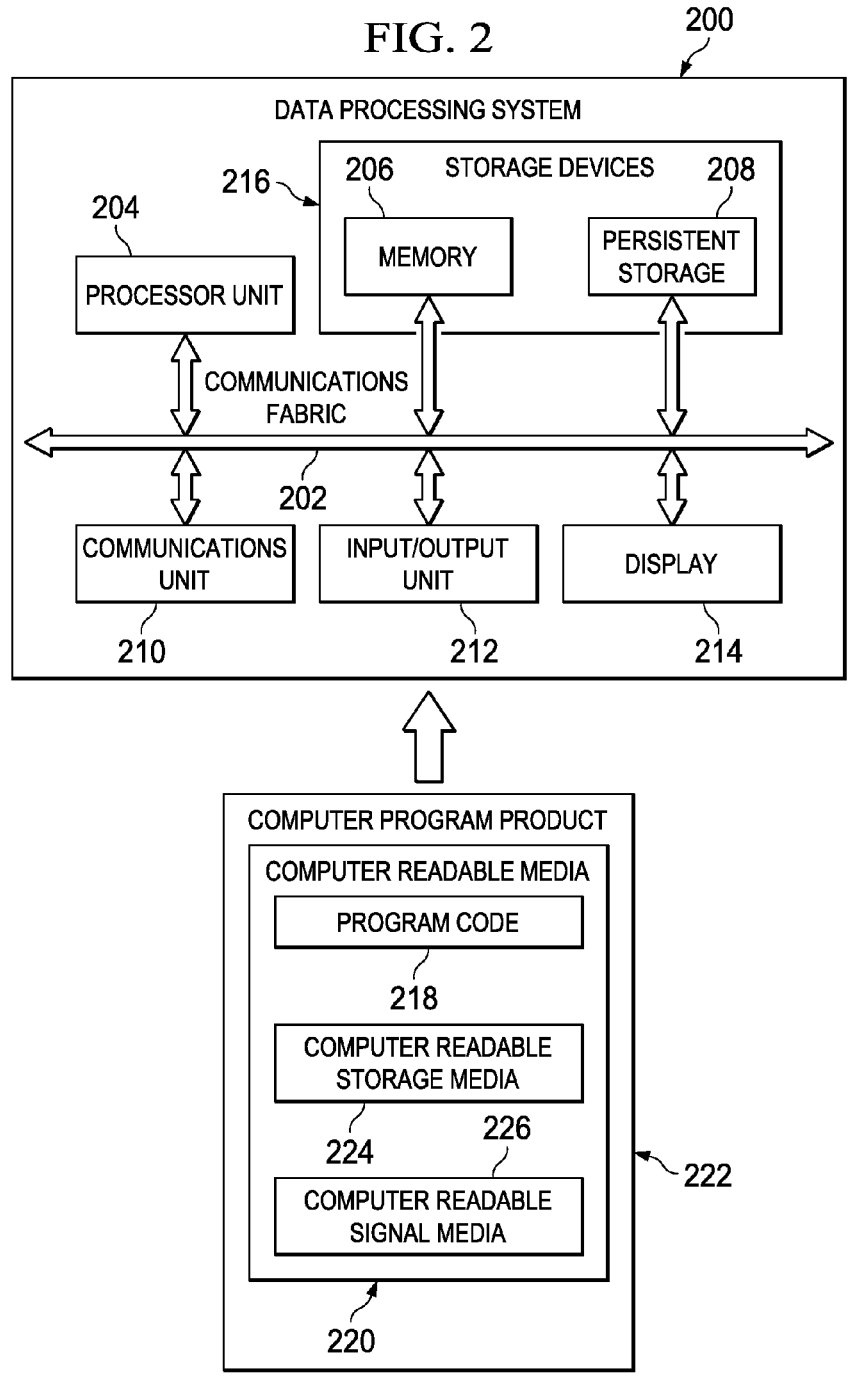
FIG. 2 is a diagram of a data processing system in which illustrative embodiments may be implemented.
Figure 3:
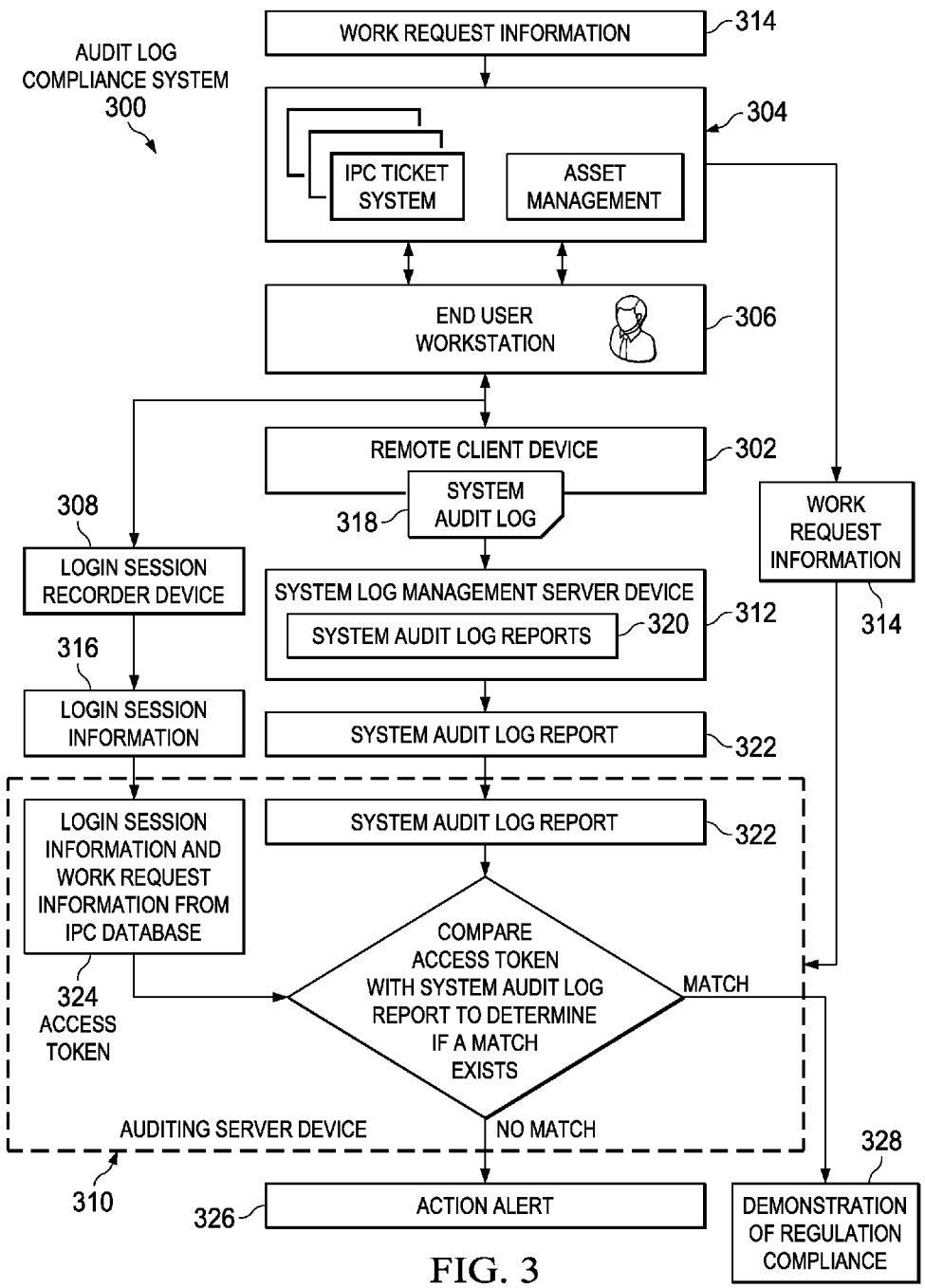
FIG. 3 is a diagram of an audit log compliance system in accordance with an illustrative embodiment.

With reference now to the figures, and in particular, with reference to FIGS. 1-3, diagrams of data processing environments are provided in which illustrative embodiments may be implemented. It should be appreciated that FIGS. 1-3 are only meant as examples and are not intended to assert or imply any limitation with regard to the environments in which different embodiments may be implemented. Many modifications to the depicted environments may be made.

FIG. 1 depicts a pictorial representation of a network of data processing systems in which illustrative embodiments may be implemented. Network data processing system 100 is a network of computers and other devices in which the illustrative embodiments may be implemented. Network data processing system 100 contains network 102, which is the medium used to provide communications links between the computers and the other various devices connected together within network data processing system 100. Network 102 may include connections, such as wire, wireless communication links, or fiber optic cables.

In the depicted example, server 104 and server 106 connect to network 102, along with storage unit 108. Server 104 may be, for example, an auditing server device that illustrative embodiments use to audit system audit logs of remote client devices to determine whether monitored user activity on the remote client device associated with a work request was in compliance with one or more regulations. A work request is a work order or work instruction that typically is or includes incident, problem, or change ticket information regarding the remote client device. The work request may either be automatically generated by the remote client device, itself, or may be manually generated by a user of the remote client device. The work request is used to have an identified problem corrected on the remote client device by an end user on an end user workstation device via network 102. A regulation may be, for example, a federal regulation provided by FFIEC or HIPAA. FFIEC is the Federal Financial Institutions Examination Council. FFIEC is a formal interagency body of the United States government empowered to prescribe uniform principles, standards, and report forms for the federal examination of financial institutions. HIPAA is the Health Insurance Portability and Accountability Act, which addresses the security and privacy of healthcare data.

Server 106 may be, for example, a system log management server device that receives audit logs from a plurality of remote client devices. The audit logs of the remote client devices include the end user workstation device activities performed on the remote client devices to correct the problems associated with the work requests. In addition, the system log management server device may store the audit logs in the form of audit log reports for each of the plurality of remote client devices. Further, server 104 and server 106 may each represent a plurality of server devices.

Storage unit 108 is a network storage device capable of storing data in a structured or unstructured format. The data stored in storage unit 108 may be data of any type. Storage unit 108 may be, for example, an incident/problem/change (IPC) ticket database of an IPC system that stores work request information received from a plurality of remote client devices. An IPC system is an information technology (IT) service management process. A goal of the IPC system IT service management process is to restore "normal service operation" as quickly as possible and to minimize the impact on business operations when a work request is received from a remote client device. Thus, the IPC system IT service management process ensures that the best possible level of service quality and availability are maintained. Normal service operation is defined as a service operation within a service level agreement (SLA).

A service level agreement typically specifies a target level of operability of network-accessible resources on remote client devices. When a network-accessible resource, such as a computer hardware component or a computer software component, located on a remote client device does not meet the specified target level of operability, a work request is generated by the remote client device or a user of the remote client device. A problem associated with a work request is any event or incident which is not part of the standard operation of a service provided by a remote client device and which causes, or may cause, an interruption to or a reduction in, the quality of that service.

Clients 110, 112, and 114 also connect to network 102. Client computers 110, 112, and 114 may be, for example, network server devices that provide IT services, such as financial services or medical services, to individuals connected to network 102. The financial service may be regulated by FFIEC regulations and the medical service may be regulated by HIPAA regulations, for example. However, it should be noted that client computers 110, 112, and 114 may provide other types of IT services that may be regulated by other types of regulations. A regulated IT service is a service that is not available for unrestricted network access. For example, a medical services application may provide online access to confidential medical history data that is protected under HIPAA regulations. Thus, access to and activities performed on a remote client device that stores this confidential medical data must be monitored and audited to determine whether HIPAA regulations are complied with. An activity or task associated with a work request performed on a remote client device that stores confidential data may be, for example, resetting a password, applying a new security patch, configuring a software application, or testing a hardware component.

In the depicted example, server computer 104 provides information, such as boot files, operating system images, and applications to client computers 110, 112, and 114. Client computers 110, 112, and 114 are clients to server computer 104 and server computer 106. Also, network data processing system 100 may include additional server computers, client computers, and other devices not shown.

Program code located in network data processing system 100 may be stored on a computer recordable storage medium and downloaded to a computer or other device for use. For example, program code may be stored on a computer recordable storage medium on server 104 and downloaded to client 110 over network 102 for use on client 110.

In the depicted example, network data processing system 100 is the Internet with network 102 representing a worldwide collection of networks and gateways that use the Transmission Control Protocol/Internet Protocol (TCP/IP) suite of protocols to communicate with one another. At the heart of the Internet is a backbone of high-speed data communication lines between major nodes or host computers, consisting of thousands of commercial, governmental, educational, and other computer systems that route data and messages. Of course, network data processing system 100 also may be implemented as a number of different types of networks, such as for example, an intranet, a local area network (LAN), or a wide area network (WAN). FIG. 1 is intended as an example, and not as an architectural limitation for the different illustrative embodiments.

With reference now to FIG. 2, a diagram of a data processing system is depicted in accordance with an illustrative embodiment. Data processing system 200 is an example of a computer, such as server 104 or client 110 in FIG. 1, in which computer usable program code or instructions implementing processes of illustrative embodiments may be located. In this illustrative example, data processing system 200 includes communications fabric 202, which provides communications between processor unit 204, memory 206, persistent storage 208, communications unit 210, input/output (I/O) unit 212, and display 214.

Processor unit 204 serves to execute instructions for software applications or programs that may be loaded into memory 206. Processor unit 204 may be a set of one or more processors or may be a multi-processor core, depending on the particular implementation. Further, processor unit 204 may be implemented using one or more heterogeneous processor systems, in which a main processor is present with secondary processors on a single chip. As another illustrative example, processor unit 204 may be a symmetric multi-processor system containing multiple processors of the same type.

Memory 206 and persistent storage 208 are examples of storage devices 216. A storage device is any piece of hardware that is capable of storing information, such as, for example, without limitation, data, program code in functional form, and/or other suitable information either on a transient basis and/or a persistent basis. Memory 206, in these examples, may be, for example, a random access memory, or any other suitable volatile or non-volatile storage device. Persistent storage 208 may take various forms, depending on the particular implementation. For example, persistent storage 208 may contain one or more devices. For example, persistent storage 208 may be a hard drive, a flash memory, a rewritable optical disk, a rewritable magnetic tape, or some combination of the above. The media used by persistent storage 208 may be removable. For example, a removable hard drive may be used for persistent storage 208.

Communications unit 210, in this example, provides for communication with other data processing systems or devices. In this example, communications unit 210 is a network interface card. Communications unit 210 may provide communications through the use of either or both physical and wireless communications links.

Input/output unit 212 allows for the input and output of data with other devices that may be connected to data processing system 200. For example, input/output unit 212 may provide a connection for user input through a keyboard, a mouse, and/or some other suitable input device. Further, input/output unit 212 may send output to a printer. Display 214 provides a mechanism to display information to a user.

Instructions for the operating system, applications, and/or programs may be located in storage devices 216, which are in communication with processor unit 204 through communications fabric 202. In this illustrative example, the instructions are in a functional form on persistent storage 208. These instructions may be loaded into memory 206 for running by processor unit 204. The processes of the different embodiments may be performed by processor unit 204 using computer implemented instructions, which may be located in a memory, such as memory 206. These instructions are referred to as program code, computer usable program code, or computer readable program code that may be read and run by a processor in processor unit 204. The program code, in the different embodiments, may be embodied on different physical or computer readable storage media, such as memory 206 or persistent storage 208.

Program code 218 is located in a functional form on computer readable media 220 that is selectively removable and may be loaded onto or transferred to data processing system 200 for running by processor unit 204. Program code 218 and computer readable media 220 form computer program product 222. In one example, computer readable media 220 may be computer readable storage media 224 or computer readable signal media 226. Computer readable storage media 224 may include, for example, an optical or magnetic disc that is inserted or placed into a drive or other device that is part of persistent storage 208 for transfer onto a storage device, such as a hard drive, that is part of persistent storage 208. Computer readable storage media 224 also may take the form of a persistent storage, such as a hard drive, a thumb drive, or a flash memory that is connected to data processing system 200. In some instances, computer readable storage media 224 may not be removable from data processing system 200.

Alternatively, program code 218 may be transferred to data processing system 200 using computer readable signal media 226. Computer readable signal media 226 may be, for example, a propagated data signal containing program code 218. For example, computer readable signal media 226 may be an electro-magnetic signal, an optical signal, and/or any other suitable type of signal. These signals may be transmitted over communication links, such as wireless communication links, an optical fiber cable, a coaxial cable, a wire, and/or any other suitable type of communications link. In other words, the communications link and/or the connection may be physical or wireless in the illustrative examples. The computer readable media also may take the form of non-tangible media, such as communication links or wireless transmissions containing the program code.

In some illustrative embodiments, program code 218 may be downloaded over a network to persistent storage 208 from another device or data processing system through computer readable signal media 226 for use within data processing system 200. For instance, program code stored in a computer readable storage media in a server data processing system may be downloaded over a network from the server to data processing system 200. The data processing system providing program code 218 may be a server computer, a client computer, or some other device capable of storing and transmitting program code 218.

The different components illustrated for data processing system 200 are not meant to provide architectural limitations to the manner in which different embodiments may be implemented. The different illustrative embodiments may be implemented in a data processing system including components in addition to, or in place of, those illustrated for data processing system 200. Other components shown in FIG. 2 can be varied from the illustrative examples shown. The different embodiments may be implemented using any hardware device or system capable of executing program code. As one example, data processing system 200 may include organic components integrated with inorganic components and/or may be comprised entirely of organic components excluding a human being. For example, a storage device may be comprised of an organic semiconductor.

As another example, a storage device in data processing system 200 is any hardware apparatus that may store data. Memory 206, persistent storage 208, and computer readable media 220 are examples of storage devices in a tangible form.

In another example, a bus system may be used to implement communications fabric 202 and may be comprised of one or more buses, such as a system bus or an input/output bus. Of course, the bus system may be implemented using any suitable type of architecture that provides for a transfer of data between different components or devices attached to the bus system. Additionally, a communications unit may include one or more devices used to transmit and receive data, such as a modem or a network adapter. Further, a memory may be, for example, memory 206 or a cache such as found in an interface and memory controller hub that may be present in communications fabric 202.

During the course of developing illustrative embodiments it was discovered that when accessing a remote client device to correct an identified problem associated with a work request, the account associated with the remote client device may be regulated by one or more regulations. A regulated account is an account that identifies a customer of the compliance auditing service and the account is regulated by regulations. The regulations may be, for example, regulations provided by state or federal agencies or laws, regulations provided by independent third party auditors, such as Price Waterhouse Coopers, or regulations provided by the customers, themselves. Thus, monitoring and auditing of privileged user activities on the remote client device to correct the identified problem must be performed to determine whether compliance with the regulations is achieved. A privileged user may be, for example, a system or application administrator.

Compliance of privileged user activities in IT service delivery is required to ensure authorization exists for the activities or actions taken on remote client devices associated with the regulated accounts. An expectation is that the number of regulators requiring this monitoring and auditing process of regulated accounts will increase. It is estimated that businesses are currently spending millions of dollars each year to comply with these regulations. Current regulation compliance monitoring tools are focused on application users within an organization and not focused on privileged users in an IT service provider environment. Consequently, significant manual effort is required to deploy and run current compliance monitoring tools to meet regulator requirements.

Illustrative embodiments provide a computer implemented method, data processing system, and computer program product for controlling point in time access to a remote client device and auditing system logs of the remote client device to determine whether monitored privileged user activity on the remote client device associated with a work request was in compliance with one or more regulations. The remote client device may be, for example, a remote server device that performs an IT service for customers of an enterprise and the IT service is regulated by federal regulations. An auditing server device receives login session information entered by a privileged user on a workstation device accessing the remote client device via a network to perform an activity associated with a work request on the remote client device. The auditing server device receives the login session information from a login session recorder device that authenticates the login session information entered by the privileged user of the workstation device by comparing the login session information with stored login session information.

The auditing server device retrieves information associated with the work request on the remote client device from an IPC database of an IPC system. The IPC database receives the information associated with the work request from the remote client device or a user of the remote client device. The auditing server device generates an access token based on the login session information entered by the privileged user accessing the remote client device to perform the activity associated with the work request and the information associated with the work request on the remote client device retrieved from the IPC database.

The auditing server device retrieves an audit log report of the remote client device that includes the activity associated with the work request performed by the workstation device on the remote client device. The auditing server device retrieves the audit log report of the remote client device from a system log management server that receives audit logs from a plurality of remote client devices. The audit log report includes activities associated with the work request performed by the workstation device on the remote client device. In one illustrative embodiment, the audit log report of the remote client device is retrieved from the system log management server on a predetermined time interval basis. In an alternative illustrative embodiment, the audit log report of the remote client device is retrieved from the system log management server on a real time basis.

The auditing server device compares the generated access token, which is based on the login session information entered by the privileged user accessing the remote client device to perform the activity associated with the work request and the information associated with the work request on the remote client device, with the audit log report of the remote client device, which includes the activity associated with the work request performed by the workstation device on the remote client device. After comparing the generated access token with the audit log report of the remote client device, the auditing server device then determines whether information in the access token matches information in the audit log report of the remote client device. In response to the auditing server device determining that the information in the access token does not match the information in the audit log report of the remote client device, the auditing server device sends an action alert. The auditing server device sends the action alert via a messaging system to a monitoring team. The messaging system may be, for example, an email messaging system, an instant messaging system, a paging system, a voicemail system, or any combination thereof. In response to the auditing server device determining that the information in the access token matches the information in the audit log report of the remote client device, the auditing server device stores an association between the access token and the audit log report of the remote client device as a demonstration of regulation compliance during a regulator audit.

Thus, illustrative embodiments provide a process and mechanism to capture system administrator activity performed on remote client devices and then pattern match this captured activity with work request information and login session information contained in an access token. Illustrative embodiments focus on the compliance of the system administrator's activities associated with the work request of the remote client device and do not focus on compliance with a service level agreement (SLA).

With reference now to FIG. 3, a diagram of an audit log compliance system is depicted in accordance with an illustrative embodiment. Audit log compliance system 300 may be implemented in network data processing system 100 in FIG. 1, for example. Audit log compliance system 300 includes remote client device 302, IPC ticket system 304, end user workstation 306, login session recorder device 308, auditing server device 310, and system log management server device 312.

Remote client device 302 is a remote server device of an enterprise that performs an IT service for customers of the enterprise and the IT service is regulated by one or more federal regulations or laws. Remote client device 302 is located at a premise of the enterprise. Remote client device 302 may be, for example, client device 110 in FIG. 1. When a problem or incident associated with a service level agreement occurs in remote client device 302 or a change associated with the service level agreement is required, either remote client device 302 or a user of remote client device 302 sends work request information 314, which is associated with the problem, incident, or change, to IPC ticket system 304. The work request information may include, for example, a ticket identification number; a type of ticket, such as an incident ticket, a problem ticket, or a change ticket; a ticket status, such as an open ticket status, an approved ticket status, a transferred ticket status, a closed ticket status, or a completed ticket status; an approval timestamp; an approval status, such as an approved status, a pending status, or a rejected status; a name of a privileged user assigned to the ticket identification; a ticket start timestamp; a ticket end timestamp; a description of the ticket; a name of an organization that approved the ticket identification; and a customer identification number that is associated with the remote client device.

IPC ticket system 304 stores work request information 314 in a database, such as storage unit 108 in FIG. 1. In addition, IPC ticket system 304 stores a plurality of work requests received from a plurality of remote client devices in the IPC ticket database. Also, IPC ticket system 304 may include an asset management database that stores inventory data for the plurality of remote client devices. End user workstation 306 is a workstation used by the privileged user to access remote client device 302 to perform one or more activities or tasks to correct the problem associated with work request information 314. The privileged user uses end user workstation 306 to retrieve work request information 314 from the database in IPC ticket system 304.

Login session recorder device 308 receives login session information from end user workstation 306 to access remote client device 302. Login session recorder device 308 authenticates the login session information entered by the privileged user on end user workstation 306 by comparing the entered login session information with stored login session information, such as user name and password. After authenticating the login session information entered by the privileged user, login session recorder device 308 grants access to remote client device 302 by end user workstation 306. In addition, login session recorder device 308 sends login session information 316 to auditing server device 310. Login session information 316 may include, for example, an internet protocol (IP) address of the workstation device where the privileged user logged in; a name of the privileged user; a timestamp of the workstation device when the login session information was generated; a first timestamp of the remote client device when the privileged user logged in to the remote client device to perform the activity associated with the work request; a second timestamp of the remote client device when the privileged user logged out of the remote client device; a reason to access the remote client device; an internet protocol address of the remote client device; and a universal identifier (UID) used to access the remote client device.

After the privileged user accesses remote client device 302 to perform the needed activities to correct the problem associated with work request information 314, a software agent residing on remote client device 302 monitors and records the privileged user's activities on remote client device 302 in system audit log 318. Remote client device 302 sends system audit log 318, which includes the privileged user's activities associated with work request information 314 to system log management server 312. System log management server 312 may be, for example, server 106 in FIG. 1. System log management server 312 is not located at an enterprise premise and is a server that manages and stores a plurality of system audit logs of a plurality of remote client devices in system audit log reports 320. System audit log reports 320 represent a system audit log report for each of the plurality of remote client devices that sent a system audit log to system log management server device 312.

Auditing server device 310 audits the system audit log reports of a plurality of remote client devices to determine whether monitored privileged user activities on the plurality of remote client devices associated with work requests were in compliance with regulations. Auditing server device 310 may be, for example, server 104 in FIG. 1. Auditing server device 310 retrieves work request information 314 of remote client device 302 from IPC ticket system 304. It should be noted that auditing server device 310 may retrieve all of the information included in work request information 314 or may only retrieve a portion of the information included in work request information 314. Auditing server device 310 generates access token 324 based on login session information 316 and work request information 314.

Auditing server device 310 also retrieves system audit log report 322 of remote client device 302. System audit log report 322 includes the privileged user's activity associated with work request information 314 performed on remote client device 302. Auditing server device 310 retrieves system audit log report 322 from system log management server device 312. In one illustrative embodiment, system audit log reports of the remote client devices are retrieved from system log management server device 312 on a predetermined time interval basis. In an alternative illustrative embodiment, the system audit log reports of the remote client devices are retrieved from system log management server device 312 on a real time basis.

Auditing server device 310 compares access token 324, which is based on the login session information 316 and work request information 314, with system audit log report 322 of remote client device 302, which includes the privileged user's activity associated with work request information 314 performed on remote client device 302. Auditing server device 310 then determines whether information in access token 324 matches information in system audit log report 322 of remote client device 302. For example, auditing server device 310 may determine whether the IP address of end user workstation 306 where the privileged user logged in, the name of the privileged user that logged in, the timestamp of remote client device 302 when the privileged user logged in to remote client device 302 to perform the activity associated with work request information 314, the timestamp of remote client device 302 when the privileged user logged out of remote client device 302, the reason to access remote client device 302, and the IP address of remote client device 302 contained within access token 324 matches the information contained within system audit log report 322 of remote client device 302.

In response to determining that the information in access token 324 does not match the information in system audit log report 322 of remote client device 302, auditing server device 310 sends action alert 326. Auditing server device 310 sends action alert 326 via a messaging system to a compliance monitoring team. The messaging system may be, for example, an email messaging system, an instant messaging system, a paging system, or a voicemail system. In response to determining that the information in access token 324 matches the information in system audit log report 322 of remote client device 302, auditing server device 310 stores demonstration of regulation compliance 328. Demonstration of regulation compliance 328 may be, for example, an association between the access token and the audit log report of the remote client device demonstrating regulation compliance during a regulator audit. Also it should be noted that in alternative illustrative embodiments, the functionality of auditing server device 310 may be located on end user workstation 306 instead of auditing server device 310 or in addition to auditing server device 310.

Further, illustrative embodiments may determine what privileged user activities are monitored by utilizing one or more access policies. An access policy may define, for example, which user commands are blocked and which user commands are allowed, which user activities are recorded in a system audit log and which user activities are not, and which user activities require immediate action.

Figure 4:
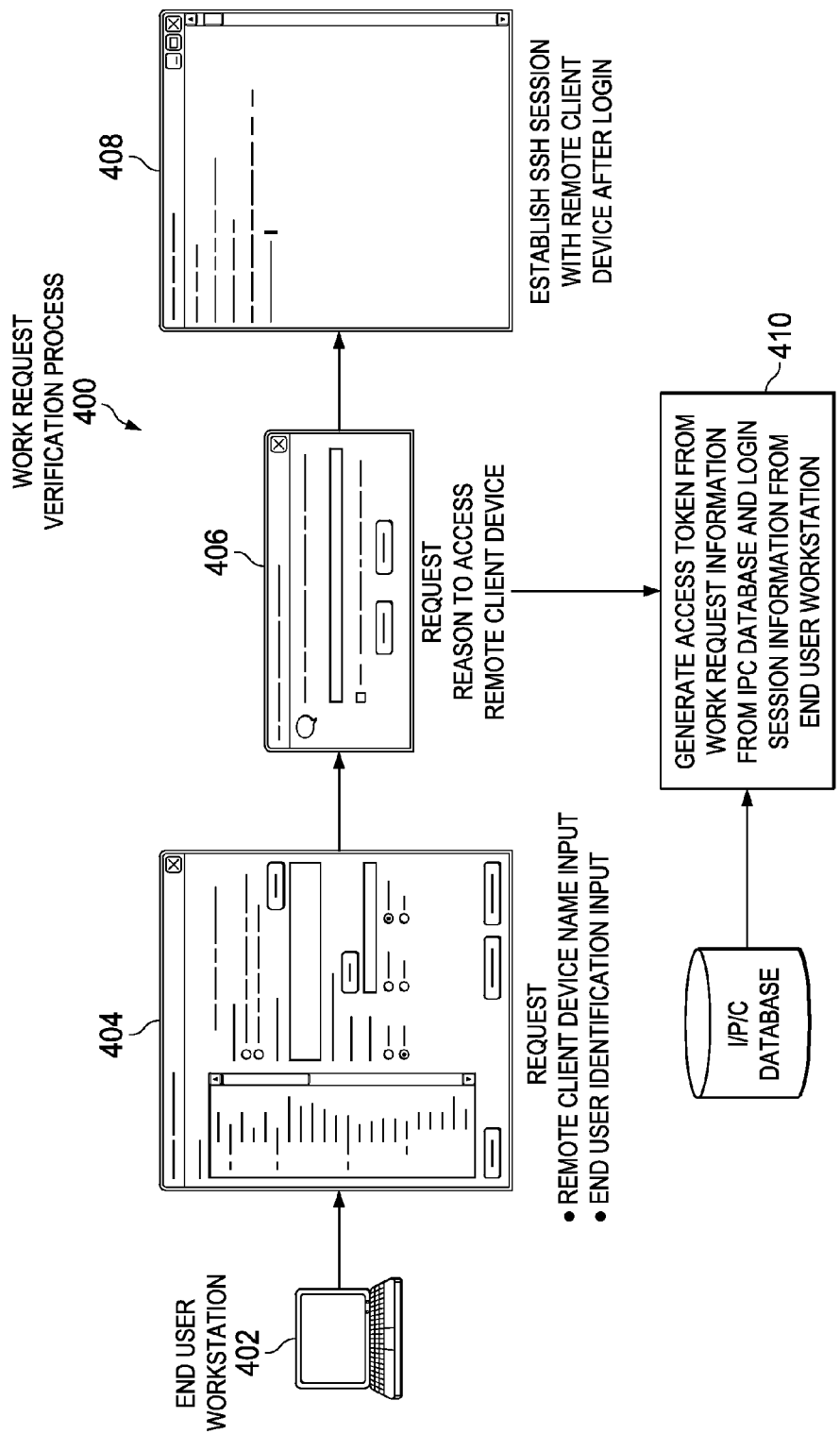
FIG. 4 is a diagram illustrating an example of a work request verification process in accordance with an illustrative embodiment.

With reference now to FIG. 4, a diagram illustrating an example of a work request verification process is depicted in accordance with an illustrative embodiment. Work request verification process 400 may be, for example, implemented in audit log compliance system 300 in FIG. 3. Work request verification process 400 includes process steps 402, 404, 406, 408, and 410.

At process step 402, a privileged user, such as a system administrator, at an end user workstation retrieves work request information that was received by an IPC ticket system from a remote client device or a user of the remote client device. For example, end user workstation 306 retrieves work request information 314 that was received by IPC ticket system 304 regarding remote client device 302 in FIG. 3. The work instruction information describes a problem or incident encountered on the remote client device that requires correction or describes a change required on the remote client device in accordance with a service level agreement. At process step 404, a software agent located on the end user workstation requests input from the privileged user using a graphical user interface. The dialogue is instrumented by the software agent. The requested input may be, for example, a remote client device name input and an end user identification input.

At process step 406, the software agent located on the end user workstation requests a reason to access the remote client device from the end user using another graphical user interface. Thus, the software agent forces the privileged user to enter work request information and user information in order to access the remote client device. At process step 408, a secure shell (SSH) session is established between the end user workstation and the remote client device after login by the privileged user. Secure shell is a network protocol for secure data communication between two networked computers that it connects via a secure channel over an insecure network. Secure shell is typically used to log into a remote machine and execute commands. However, it should be noted that illustrative embodiments are not limited to SSH clients, but that illustrative embodiments may be applied to all user interfaces that require a user identification and password to access.

At process step 410, the end user workstation generates an access token, such as access token 324 in FIG. 3, based on the work request information retrieved from the IPC ticket database by the end user workstation and the login session information received from the privileged user by the end user workstation. The generated access token is used to control point in time access to the remote client device and verify compliance with federal regulations by the privileged user when performing one or more activities to correct a problem on the remote client device associated with a work request.

It should be noted that work request verification process 400 is only intended as an example and not intended as a limitation on illustrative embodiments. For example, work request verification process 400 may include more or few process steps than illustrated or may combine process steps.

Figure 5:
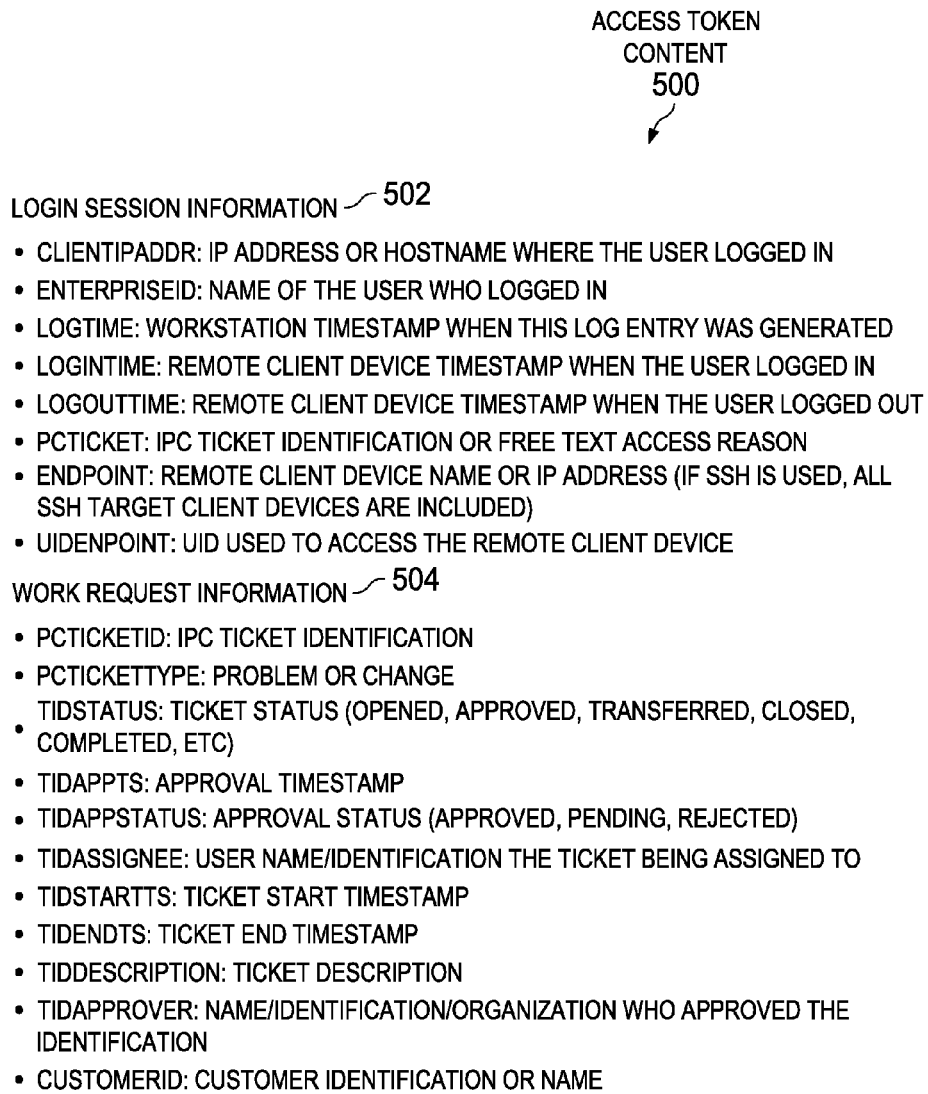
FIG. 5 is a specific example of access token content in accordance with an illustrative embodiment.

With reference now to FIG. 5, a specific example of access token content is depicted in accordance with an illustrative embodiment. Access token content 500 is the information included in an access token, such as access token 324 in FIG. 3. Access token content 500 includes login session information 502 and work request information 504.

Login session information 502 may be, for example, login session information 316 in FIG. 3. Login session information 502 includes an internet protocol (IP) address of a workstation device, such as end user workstation 306 in FIG. 3, where the privileged user logged in; a name of the privileged user; a timestamp of the workstation device when the login session information was generated; a reason to access a remote client device, such as remote client device 302 in FIG. 3; a first timestamp of the remote client device when the privileged user logged in to the remote client device to perform an activity associated with a work request; a second timestamp of the remote client device when the privileged user logged out of the remote client device; an internet protocol address of the remote client device; and a universal identifier (UID) used to access the remote client device.

Work request information 504 may be, for example, work request information 314 in FIG. 3. Work request information 504 includes a ticket identification number; a type of ticket, such as an incident ticket, a problem ticket, or a change ticket; a ticket status, such as an open ticket status, an approved ticket status, a transferred ticket status, a closed ticket status, or a completed ticket status; an approval timestamp; an approval status, such as an approved status, a pending status, or a rejected status; a name of a privileged user assigned to the ticket identification; a ticket start timestamp; a ticket end timestamp; a description of the ticket; a name of an organization that approved the ticket identification; and a customer identification number that is associated with the remote client device.

It should be noted that access token content 500 is only intended as an example and not intended as a limitation on illustrative embodiments. For example, access token content 500 may include more or less information than illustrated.

Figure 6:
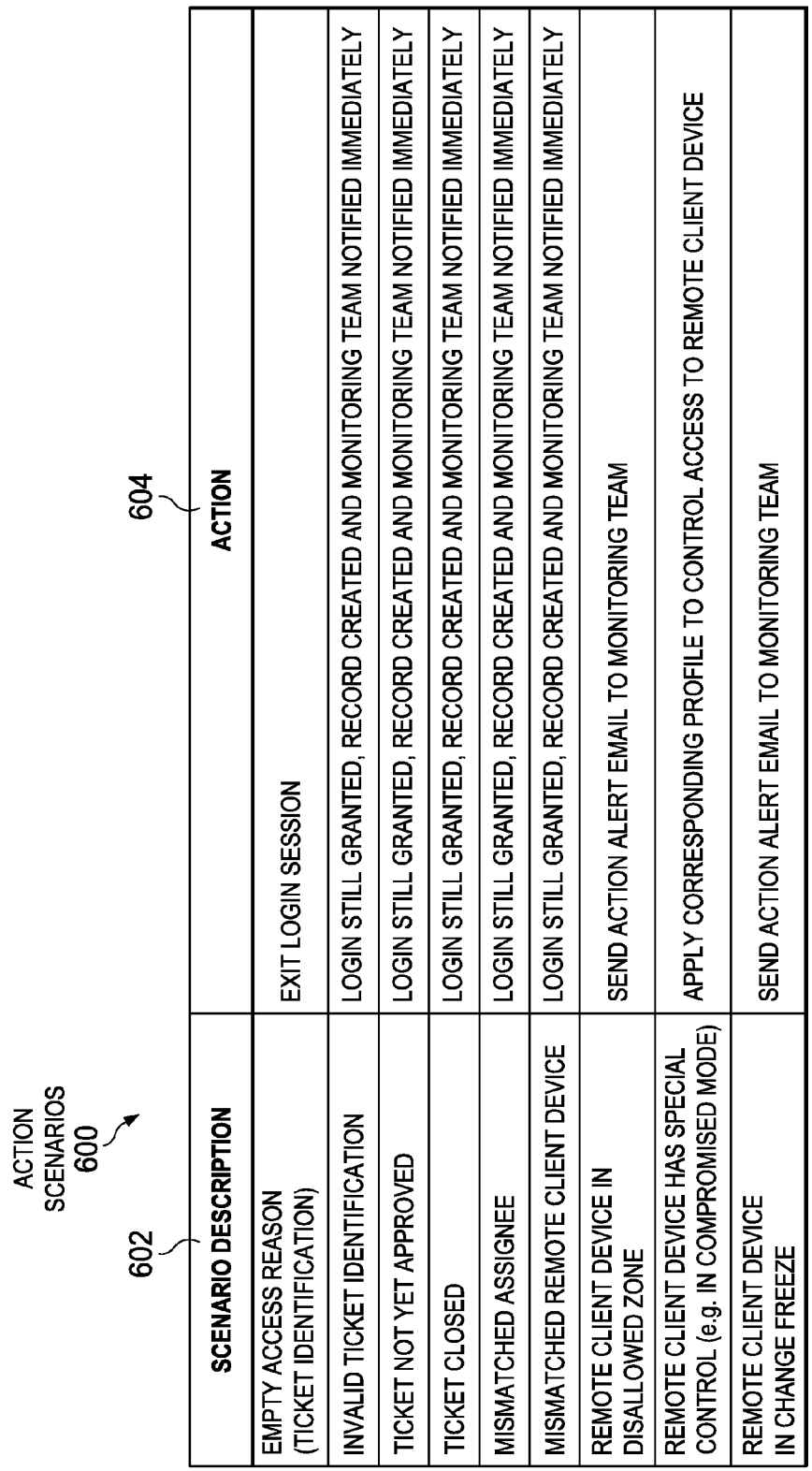
FIG. 6 is a specific example of action scenarios in accordance with an illustrative embodiment.

With reference now to FIG. 6, a specific example of action scenarios is depicted in accordance with an illustrative embodiment. Action scenarios 600 may be implemented in, for example, an auditing server device, such as auditing server device 310 in FIG. 3. Alternatively, action scenarios 600 may be implemented in an end user workstation, such as end user workstation 306 in FIG. 3.

Action scenarios 600 include scenario description 602 and action 604. Scenario description 602 describes a specific scenario that requires the auditing server device or the end user workstation to take an associated action. Action 604 defines the action to be taken for an associated scenario in scenario description 602. Action 604 may be, for example, action alert 326 in FIG. 3.

The auditing server device or the end user workstation uses action scenarios 600 to determine which action to take when a specific scenario is encountered. For example, when the end user workstation encounters an empty access reason associated with an IPC ticket identification number, the end user workstation exits that particular login session. As another example, when the auditing server device encounters a remote client device in change freeze, the auditing server device sends an action alert email to a monitoring team.

It should be noted that action scenarios 600 are only intended as examples and are not intended as limitations on illustrative embodiments. For example, action scenarios 600 may include more or fewer scenarios than illustrated or may combine scenarios.

Figure 7:
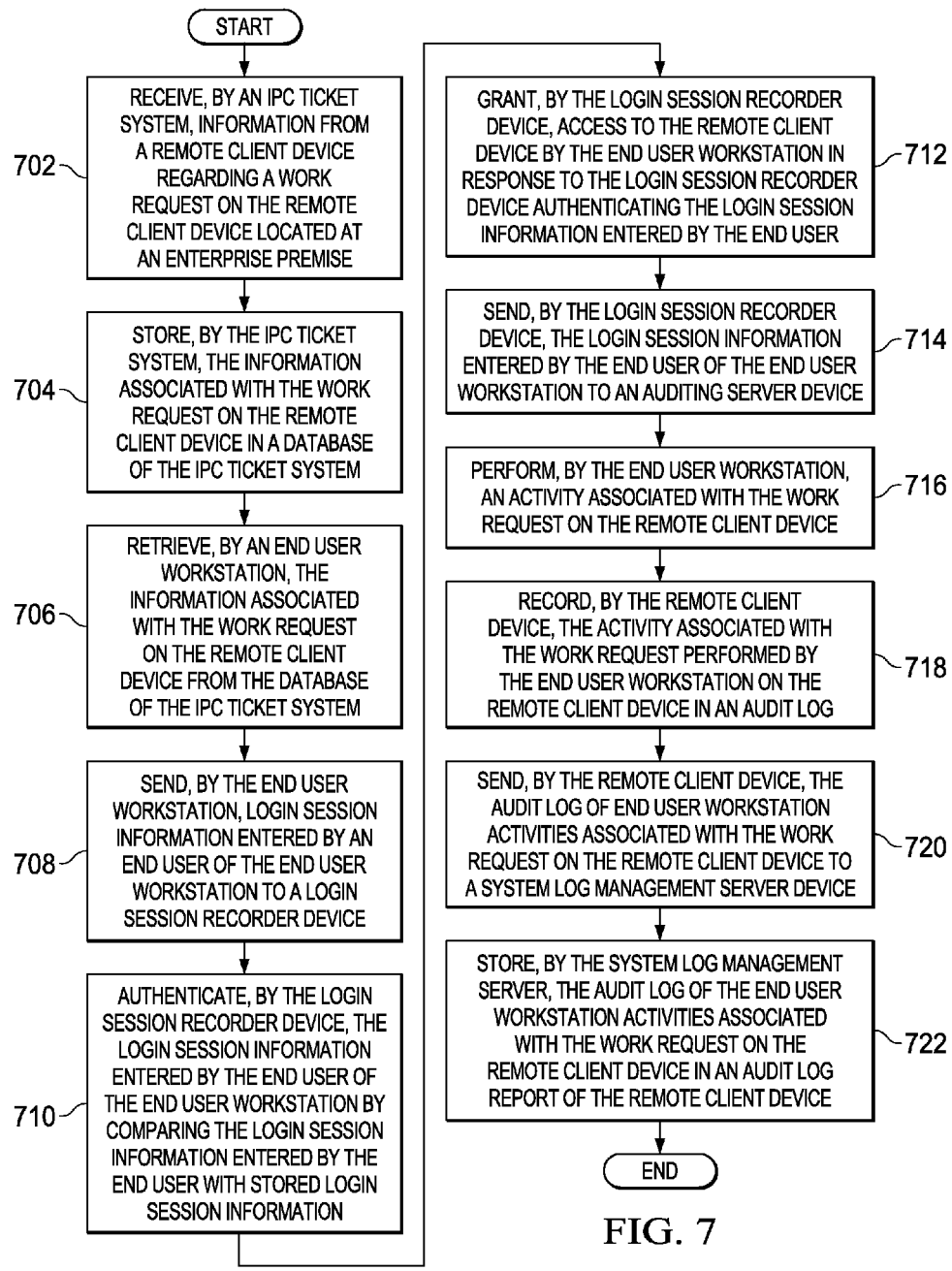
FIG. 7 is a flowchart illustrating a process for collecting information in an audit log compliance system.

With reference now to FIG. 7, a flowchart illustrating a process for collecting information in an audit log compliance system is shown in accordance with an illustrative embodiment. The process shown in FIG. 7 may be implemented in an audit log compliance system, such as, for example, audit log compliance system 300 in FIG. 3.

The process begins when an IPC ticket system receives information from a remote client device regarding a work request on the remote client device located at an enterprise premise (step 702). For example, IPC ticket system 304 receives work request information 314 regarding remote client device 302 in FIG. 3. The IPC ticket system stores the information associated with the work request on the remote client device in a database of the IPC ticket system (step 704).

An end user workstation, such as end user workstation 306 in FIG. 3, retrieves the information associated with the work request on the remote client device from the database of the IPC ticket system (step 706). The end user workstation sends login session information entered by an end user of the end user workstation to a login session recorder device, such as login session recorder device 308 in FIG. 3 (step 708). The login session information may include, for example, a user name and password. The login session recorder device authenticates the login session information entered by the end user of the end user workstation by comparing the login session information entered by the end user with stored login session information (step 710).

The login session recorder device grants access to the remote client device by the end user workstation in response to the login session recorder device authenticating the login session information entered by the end user (step 712). The login session recorder device sends the login session information entered by the end user of the end user workstation to an auditing server device, such as auditing server device 310 in FIG. 3 (step 714). After receiving access to the remote client device in step 712, the end user workstation performs an activity associated with the work request on the remote client device (step 716). The activity performed on the remote client device is to correct the incident or problem or make the required change associated with the work request.

The remote client device records the activity associated with the work request performed by the end user workstation on the remote client device in an audit log (step 718). The remote client device uses, for example, a software agent to record the activities or tasks performed on the remote client device by the end user workstation. The remote client device sends the audit log of end user workstation activities associated with the work request on the remote client device to a system log management server device, such as system log management server device 312 in FIG. 3 (step 720). The system log management server stores the audit log of the end user workstation activities associated with the work request on the remote client device in an audit log report of the remote client device, such as system audit log report 322 in FIG. 3 (step 722). The process terminates thereafter.

Figure 8:
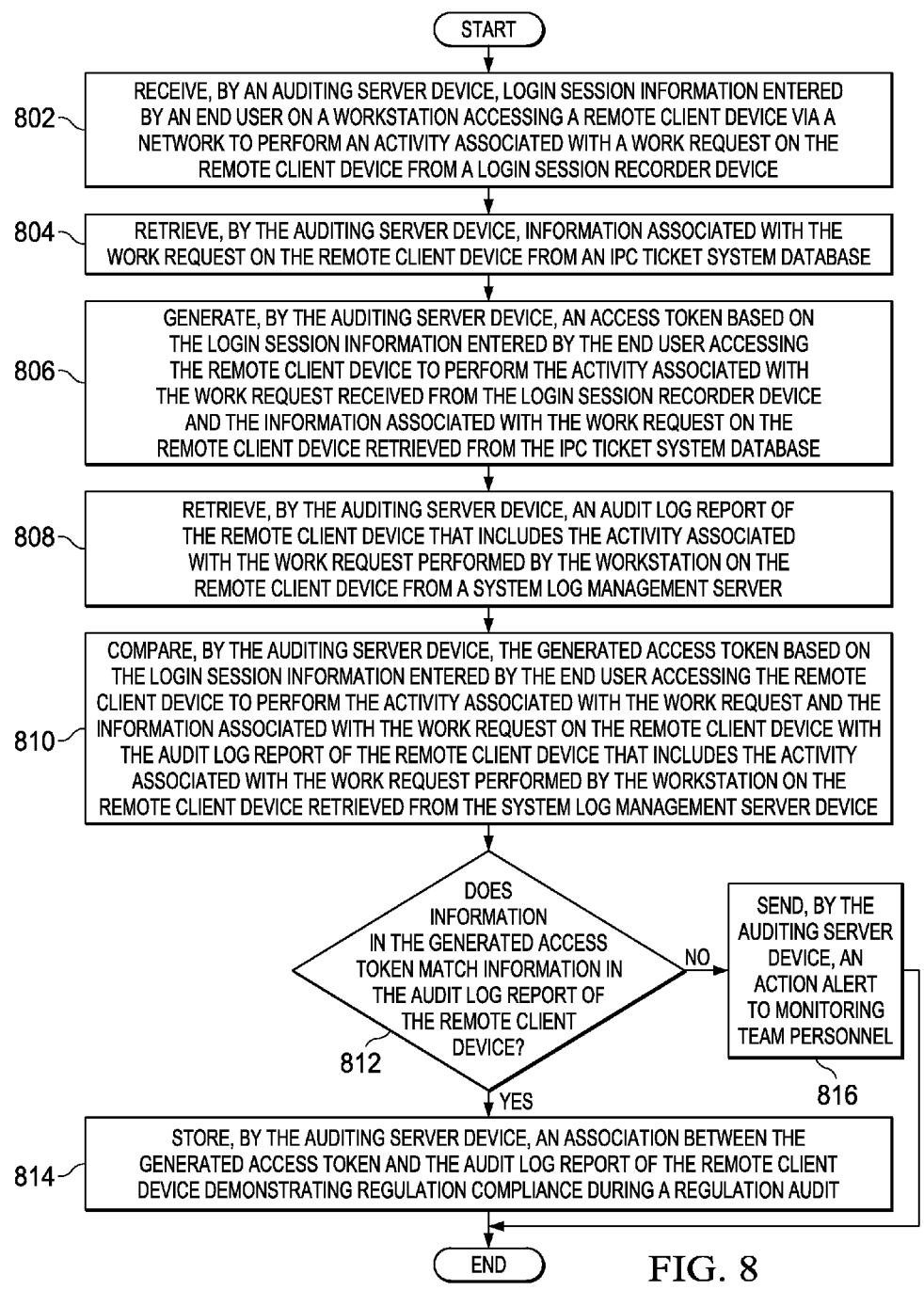
FIG. 8 is a flowchart illustrating a process for generating an access token to audit system log reports of remote client devices by an auditing server device in accordance with an illustrative embodiment; and FIG. 9A

With reference now to FIG. 8, a flowchart illustrating a process for generating an access token to audit system log reports of remote client devices by an auditing server device is shown in accordance with an illustrative embodiment. The process shown in FIG. 8 may be implemented in an auditing server device, such as, for example, auditing server device 310 in FIG. 3.

The process begins when the auditing server device receives login session information entered by an end user on a workstation accessing a remote client device via a network to perform an activity associated with a work request on the remote client device from a login session recorder device (step 802). For example, auditing server device 310 receives login session information 316 entered by an end user on end user workstation 306 accessing remote client device 302 via a network to perform an activity associated with a work request on remote client device 302 from login session recorder device 308 in FIG. 3. The network may be, for example, network 102 in FIG. 1.

The auditing server device retrieves information associated with the work request on the remote client device from an IPC ticket system database (step 804). For example, auditing server device 310 retrieves work request information 314 from IPC ticket system 304 regarding remote client device 302 in FIG. 3. The auditing server device generates an access token, such as access token 324 in FIG. 3, based on the login session information entered by the end user accessing the remote client device to perform the activity associated with the work request received from the login session recorder device and the information associated with the work request on the remote client device retrieved from the IPC ticket system database (step 806).

The auditing server device also retrieves an audit log report of the remote client device that includes the activity associated with the work request performed by the workstation on the remote client device from a system log management server device (step 808). For example, auditing server device 310 retrieves system audit log report 322 from system log management server device 312 regarding remote client device 302 in FIG. 3. The auditing server device compares the generated access token based on the login session information entered by the end user accessing the remote client device to perform the activity associated with the work request and the information associated with the work request on the remote client device with the audit log report of the remote client device that includes the activity associated with the work request performed by the workstation on the remote client device retrieved from the system log management server device (step 810).

Subsequent to comparing the generated access token with the audit log report of the remote client device in step 810, the auditing server device makes a determination as to whether information in the generated access token matches information in the audit log report of the remote client device (step 812). If the auditing server device determines that the information in the generated access token matches the information in the audit log report of the remote client device, yes output of step 812, then the auditing server device stores a demonstration of regulation compliance, such as demonstration of regulation compliance 328 (step 814). A demonstration of regulation compliance may be, for example, an association between the access token and the audit log report of the remote client device demonstrating regulation compliance during a regulator audit. If the auditing server device determines that the information in the generated access token does not match the information in the audit log report of the remote client device, no output of step 812, then the auditing server device sends an action alert, such as action alert 326 in FIG. 3, to monitoring team personnel (step 816). The auditing server device may send the action alert via, for example, a messaging system, such as an email messaging system, an instant messaging system, a paging system, a voicemail system, or any combination thereof. The process terminates thereafter.

Figure 9B:
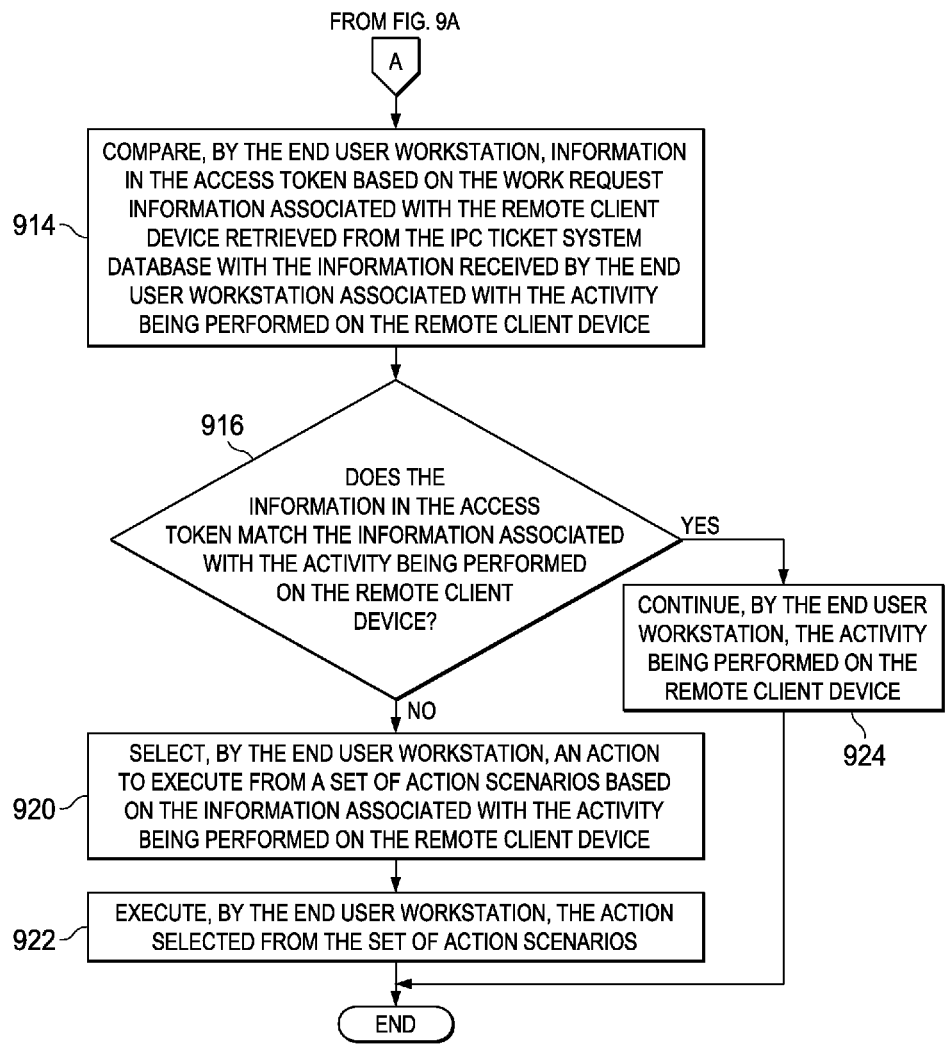
FIG. 9B is a flowchart illustrating a process for controlling access to a remote client device in accordance with an illustrative embodiment.

With reference now to FIG. 9A and FIG. 9B, a flowchart illustrating a process for controlling access to a remote client device is shown in accordance with an illustrative embodiment. The process shown in FIGS. 9A and 9B may be implemented in an end user workstation, such as, for example, end user workstation 308 in FIG. 3 or the end user workstation of process step 402 in FIG. 4.

The process begins when the end user workstation monitors all application activities on the end user workstation (step 902). The end user workstation may use, for example, a software agent to perform the monitoring step and other steps in the process. Subsequent to monitoring all application activities in step 902, the end user workstation makes a determination as to whether an application is performing an activity on a remote client device via a network (step 904). If the end user workstation determines that no applications are performing an activity on a remote client device via a network, no output of step 904, then the process returns to step 902 where the end user workstation continues to monitor all application activities. If the end user workstation determines that an application is performing an activity on a remote client device via a network, yes output of step 904, then the end user workstation requests information associated with the activity being performed on the remote client device via a dialog window (step 906). The dialog window may be, for example, the dialog window in process step 404 and/or process step 406 in FIG. 4. Also, the information may be requested from an end user of the end user workstation. Alternatively, the information may be requested from the application performing the activity on the remote client device.

The end user workstation receives the requested information associated with the activity being performed on the remote client device (step 908). Afterward, the end user workstation retrieves work request information associated with the remote client device from an IPC ticket system database based on the information received by the end user workstation associated with the activity being performed on the remote client device (step 910). The work request information associated with the remote client device may be, for example, work request information 314 associated with remote client device 302 stored in IPC ticket system 304 in FIG. 3. The end user workstation generates an access token based on the work request information associated with the remote client device retrieved from the IPC ticket system database (step 912). Subsequently, the end user workstation compares information in the access token based on the work request information associated with the remote client device retrieved from the IPC ticket system database with the information received by the end user workstation associated with the activity being performed on the remote client device (step 914).

Then, the end user workstation makes a determination as to whether the information in the access token matches the information associated with the activity being performed on the remote client device (step 916). If the end user workstation determines that the information in the access token matches the information associated with the activity being performed on the remote client device, yes output of step 916, then the end user workstation continues the activity being performed on the remote client device (step 918). If the end user workstation determines that the information in the access token does not match the information associated with the activity being performed on the remote client device, no output of step 916, then the end user workstation selects an action to execute from a set of action scenarios based on the information associated with the activity being performed on the remote client device (step 920). The action may be, for example, action 604 based on scenario description 602 within action scenarios 600 in FIG. 6. Afterward, the end user workstation executes the action selected from the set of action scenarios (step 922). The process terminates thereafter.

Thus, illustrative embodiments of the present invention provide a computer implemented method, data processing system, and computer program product for controlling point in time access to a remote client device and auditing system logs of the remote client device by an auditing server device to determine whether monitored user activity on the remote client device associated with a work request was in compliance with one or more regulations. The flowchart and block diagrams in the Figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiments with various modifications as are suited to the particular use contemplated.

What is claimed is:

1. A computer implemented method for auditing system logs of a remote client device, the computer implemented method comprising:
    receiving, by a data processing device, login session information that includes an internet protocol address of a workstation device where a user logged in, a name of the user, a timestamp of the workstation device when the login session information was generated, a first timestamp of the remote client device when the user logged in to the remote client device to perform an activity associated with a work request, a second timestamp of the remote client device when the user logged out of the remote client device, a reason to access the remote client device, and an internet protocol address of the remote client device entered at the workstation device accessing the remote client device via a network to perform the activity to correct a problem on the remote client device associated with the work request, wherein the remote client device is a remote server device that performs an information technology service for customers, and wherein the information technology service is regulated by federal regulations;
    retrieving, by the data processing device, information associated with the work request to correct the problem on the remote client device that includes a problem ticket identification, a problem ticket status, the name of the user assigned to the problem ticket identification, a description of the problem ticket, and a customer identification associated with the remote client device;
    generating, by the data processing device, an access token based on the login session information that includes the internet protocol address of the workstation device where the user logged in, the name of the user, the timestamp of the workstation device when the login session information was generated, the first timestamp of the remote client device when the user logged in to the remote client device to perform the activity associated with the work request, the second timestamp of the remote client device when the user logged out of the remote client device, the reason to access the remote client device, and the internet protocol address of the remote client device entered at the workstation device accessing the remote client device to perform the activity to correct the problem on the remote client device associated with the work request and the information associated with the work request to correct the problem on the remote client device that includes the problem ticket identification, the problem ticket status, the name of the user assigned to the problem ticket identification, the description of the problem ticket, and the customer identification associated with the remote client device;
    comparing, by the data processing device, the access token based on the login session information and the information associated with the work request to correct the problem on the remote client device with an audit log report of the remote client device that includes the activity to correct the problem on the remote client device associated with the work request performed by the workstation device on the remote client device;
    determining, by the data processing device, whether information in the access token matches information in the audit log report of the remote client device;
    responsive to determining that the information in the access token matches the information in the audit log report of the remote client device, storing, by the data processing device, an association between the access token and the audit log report of the remote client device demonstrating compliance with the federal regulations; and
    responsive to determining that the information in the access token does not match the information in the audit log report of the remote client device, sending, by the data processing device, an action alert via a voicemail messaging system to compliance monitoring personnel.

2. The computer implemented method of claim 1, wherein the login session information is received from a login session recorder device that authenticates the login session information entered at the workstation device by comparing the login session information with stored login session information.

3. The computer implemented method of claim 1, wherein the audit log report of the remote client device is retrieved from a system log management server that receives audit logs from a plurality of remote client devices, and wherein the audit logs include activities associated with work requests performed by the workstation device on the plurality of remote client devices to form audit log reports.

4. The computer implemented method of claim 3, wherein the audit log report of the remote client device is retrieved from the system log management server on a predetermined time interval basis.

5. The computer implemented method of claim 3, wherein the audit log report of the remote client device is retrieved from the system log management server on a real time basis.

6. The computer implemented method of claim 1, wherein the information associated with the work request on the remote client device is retrieved from an incident/problem/ change ticket system database that receives the information from the remote client device.

7. The computer implemented method of claim 1, wherein the activity to correct the problem on the remote client device associated with the work request is audited to determine compliance with the federal regulations corresponding to the information technology service.

8. A data processing system for auditing system logs of a remote client device, the data processing system comprising:
a bus system;
a storage device connected to bus system, wherein the storage device stores a set of instructions; and
a processing unit connected to the bus system, wherein the processing unit executes the set of instructions to receive login session information that includes an internet protocol address of a workstation device where a user logged in, a name of the user, a timestamp of the workstation device when the login session information was generated, a first timestamp of the remote client device when the user logged in to the remote client device to perform an activity associated with a work request, a second timestamp of the remote client device when the user logged out of the remote client device, a reason to access the remote client device, and an internet protocol address of the remote client device entered at the workstation device accessing the remote client device via a network to perform the activity to correct a problem on the remote client device associated with the work request, wherein the remote client device is a remote server device that performs an information technology service for customers, and wherein the information technology service is regulated by federal regulations; retrieve information associated with the work request to correct the problem on the remote client device that includes a problem ticket identification, a problem ticket status, the name of the user assigned to the problem ticket identification, a description of the problem ticket, and a customer identification associated with the remote client device; generate an access token based on the login session information that includes the internet protocol address of the workstation device where the user logged in, the name of the user, the timestamp of the workstation device when the login session information was generated, the first timestamp of the remote client device when the user logged in to the remote client device to perform the activity associated with the work request, the second timestamp of the remote client device when the user logged out of the remote client device, the reason to access the remote client device, and the internet protocol address of the remote client device entered at the workstation device accessing the remote client device to perform the activity to correct the problem on the remote client device associated with the work request and the information associated with the work request to correct the problem on the remote client device that includes the problem ticket identification, the problem ticket status, the name of the user assigned to the problem ticket identification, the description of the problem ticket, and the customer identification associated with the remote client device; compare the access token based on the login session information and the information associated with the work request to correct the problem on the remote client device with an audit log report of the remote client device that includes the activity to correct the problem on the remote client device associated with the work request performed by the workstation device on the remote client device; determine whether information in the access token matches information in the audit log report of the remote client device; store an association between the access token and the audit log report of the remote client device demonstrating compliance with the federal regulations in response to determining that the information in the access token matches the information in the audit log report of the remote client device; and send an action alert via a voicemail messaging system to compliance monitoring personnel in response to determining that the information in the access token does not match the information in the audit log report of the remote client device.

9. A computer program product stored on a computer readable storage device having computer usable program code embodied thereon that is executable by a computer for auditing system logs of a remote client device, the computer program product comprising:
computer usable program code for receiving login session information that includes an internet protocol address of a workstation device where a user logged in, a name of the user, a timestamp of the workstation device when the login session information was generated, a first timestamp of the remote client device when the user logged in to the remote client device to perform an activity associated with a work request, a second timestamp of the remote client device when the user logged out of the remote client device, a reason to access the remote client device, and an internet protocol address of the remote client device entered at the workstation device accessing the remote client device via a network to perform the activity to correct a problem on the remote client device associated with the work request, wherein the remote client device is a remote server device that performs an information technology service for customers, and wherein the information technology service is regulated by federal regulations;
computer usable program code for retrieving information associated with the work request to correct the problem on the remote client device that includes a problem ticket identification, a problem ticket status, the name of the user assigned to the problem ticket identification, a description of the problem ticket, and a customer identification associated with the remote client device;
computer usable program code for generating an access token based on the login session information that includes the internet protocol address of the workstation device where the user logged in, the name of the user, the timestamp of the workstation device when the login session information was generated, the first timestamp of the remote client device when the user logged in to the remote client device to perform the activity associated with the work request, the second timestamp of the remote client device when the user logged out of the remote client device, the reason to access the remote client device, and the internet protocol address of the remote client device entered at the workstation device accessing the remote client device to perform the activity to correct the problem on the remote client device associated with the work request and the information associated with the work request to correct the problem on the remote client device that includes the problem ticket identification, the problem ticket status, the name of the user assigned to the problem ticket identification, the description of the problem ticket, and the customer identification associated with the remote client device;
computer usable program code for comparing the access token based on the login session information and the information associated with the work request to correct the problem on the remote client device with an audit log report of the remote client device that includes the activity to correct the problem on the remote client device associated with the work request performed by the workstation device on the remote client device;

computer usable program code for determining whether information in the access token matches information in the audit log report of the remote client device;

computer usable program code for storing an association between the access token and the audit log report of the remote client device demonstrating regulation compliance with the federal regulations in response to determining that the information in the access token matches the information in the audit log report of the remote client device; and computer usable program code for sending an action alert via a voicemail messaging system to compliance monitoring personnel in response to determining that the information in the access token does not match the information in the audit log report of the remote client device.

10. The computer program product of claim 9, wherein the login session information is received from a login session recorder device that authenticates the login session information entered at the workstation device by comparing the login session information with stored login session information.

11. The computer program product of claim 9, wherein the audit log report of the remote client device is retrieved from a system log management server that receives audit logs from a plurality of remote client devices, and wherein the audit logs include activities associated with work requests performed by the workstation device on the plurality of remote client devices to form audit log reports.

12. The computer program product of claim 11, wherein the audit log report of the remote client device is retrieved from the system log management server on a predetermined time interval basis.

13. The computer program product of claim 11, wherein the audit log report of the remote client device is retrieved from the system log management server on a real time basis.

14. A computer implemented method for controlling access to a remote client device, the computer implemented method comprising:

requesting, by an end user workstation, information associated with an activity to correct a problem on the remote client device that is being performed by the end user workstation on the remote client device via a network, wherein the information associated with the activity to correct the problem on the remote client device that is being performed by the end user workstation on the remote client device is requested via a dialog window generated by a software agent executing on the end user workstation, and wherein the information includes an internet protocol address of the end user workstation where a user logged in, a name of the user, a timestamp of the end user workstation when login session information was generated, a first timestamp of the remote client device when the user logged in to the remote client device to perform the activity associated with a work request, a second timestamp of the remote client device when the user logged out of the remote client device, a reason to access the remote client device, and an internet protocol address of the remote client device, and wherein the remote client device is a remote server device that performs an information technology service for customers, and wherein the information technology service is regulated by federal regulations;

generating, by the end user workstation, an access token based on work request information associated with a work request to correct the problem on the remote client device that includes a problem ticket identification, a problem ticket status, a name of a user assigned to the problem ticket identification, a description of the problem ticket, and a customer identification associated with the remote client device retrieved from a database;

determining, by the end user workstation, whether information in the access token based on the work request information associated with the work request to correct the problem on the remote client device that includes the problem ticket identification, the problem ticket status, the name of the user assigned to the problem ticket identification, the description of the problem ticket, and the customer identification associated with the remote client device retrieved from the database matches the information associated with the activity to correct the problem on the remote client device that is being performed by the end user workstation on the remote client device via the network; and responsive to the end user workstation determining that the information in the access token based on the work request information associated with the remote client device retrieved from the database does not match the information associated with the activity to correct the problem on the remote client device that is being performed by the end user workstation on the remote client device via the network, executing, by the end user workstation, an action selected from a set of action scenarios based on the information associated with the activity to correct the problem on the remote client device that is being performed by the end user workstation on the remote client device.

15. The computer implemented method of claim 14, further comprising:

responsive to the end user workstation determining that the information in the access token based on the work request information associated with the remote client device retrieved from the database matches the information associated with the activity to correct the problem on the remote client device that is being performed by the end user workstation on the remote client device via the network, continuing, by the end user workstation, the activity to correct the problem on the remote client device that is being performed by the end use workstation on the remote client device.

16. The computer implemented method of claim 14, wherein the work request information associated with the remote client device is retrieved from an incident/problem/change ticket system database based on the information received by the end user workstation associated with the activity to correct the problem on the remote client device that is being performed by the end user workstation on the remote client device.

* * * * *